Figure 1:
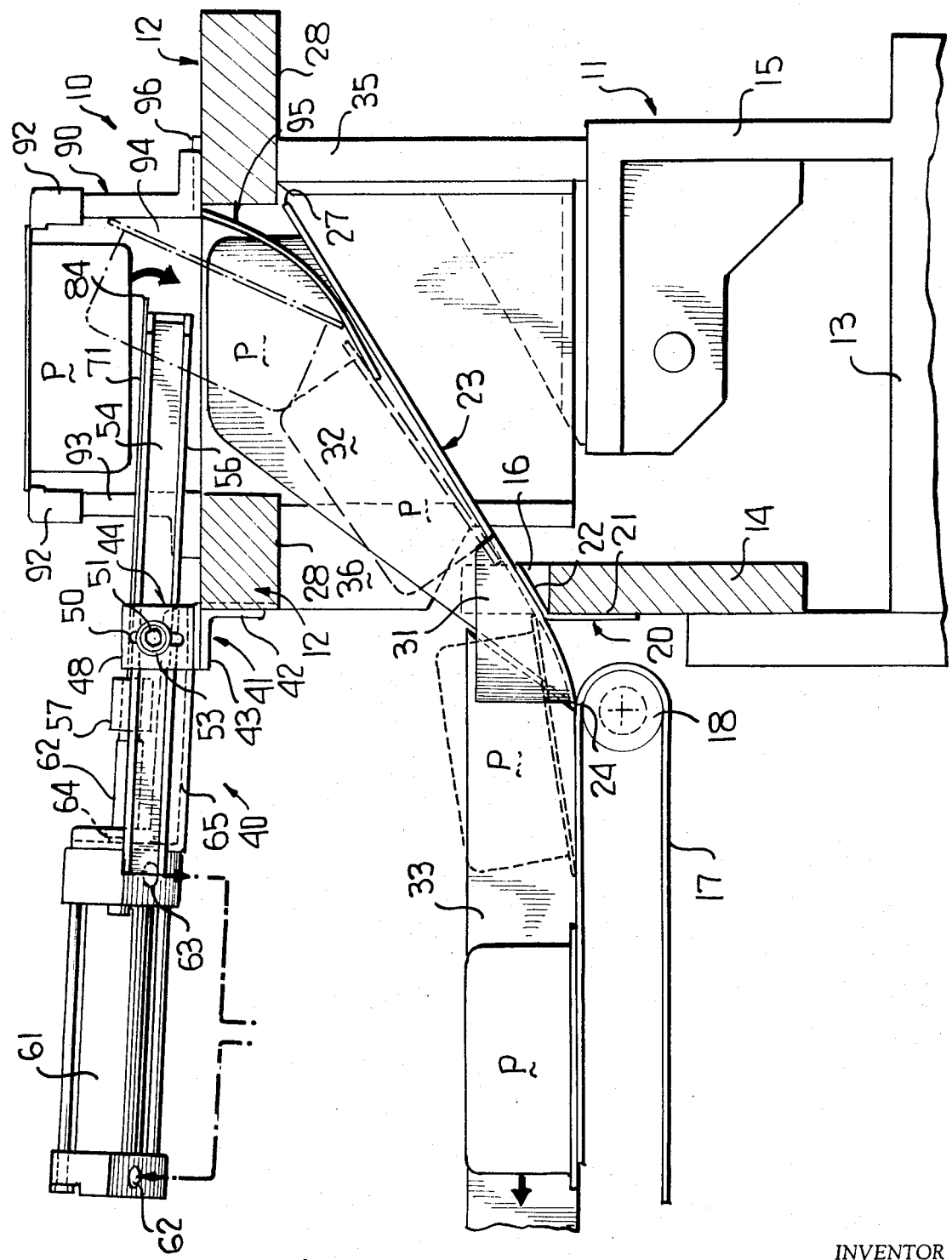

United States Patent

Skiba, Jr.

[15] 3,679,070
[45] July 25, 1972

[54] MACHINE FOR PACKAGE TURNOVER AND ORIENTATION

[72] Inventor: Alexander Skiba, Jr., Pearl River, N.Y.
[73] Assignee: Royal Packaging Equipment, Inc., Maywood, N.J.
[22] Filed: July 13, 1970
[21] Appl. No.: 54,144

[52] U.S. Cl. .......................... 214/1 Q, 193/43 C, 198/33 AA
[51] Int. Cl. ........................................................ B65g 7/00
[58] Field of Search .................. 193/43, 43 B, 43 C; 198/33, 198/33 R; 214/1 R

[56] References Cited

UNITED STATES PATENTS

| | | | |
|---|---|---|---|
| 3,282,394 | 11/1966 | Neal et al. | 214/1 Q X |
| 2,713,930 | 7/1955 | Koch | 193/43 B |
| 2,734,213 | 2/1956 | Ashford | 198/33.4 |

Primary Examiner—Robert G. Sheridan
Assistant Examiner—Frank E. Werner
Attorney—Diller, Brown, Ramik & Holt

[57] ABSTRACT

This disclosure relates to a machine for turning articles, packages or the like through approximately 180° to present the package in a desired position for subsequent processing. The machine preferably includes a plurality of pairs of chambers each of which receives a package formed from web material. Within each chamber is a platform which is progressively retracted after the packages have been severed from the web material whereupon the influence of gravity progressively tips each package during its discharge from its associated chamber. Cooperative movable and stationary guides assure the subsequent discharge of the packages to a take-away conveyor, while a vertical guide blade disposed generally in a plane between the packages maintains spacing therebetween during discharge and subsequent take-away. In addition to being tipped or turned over the packages are oriented to a desired position by providing the platforms with edges ranging from 0° to 60° relative to a plane normal to the direction of movement of the platforms.

30 Claims, 2 Drawing Figures

INVENTOR
ALEXANDER SKIBA, Jr.

MACHINE FOR PACKAGE TURNOVER AND ORIENTATION

The present invention is directed to improvements in packaging machines of the type disclosed in the commonly assigned patent to Stephen P. Lovas et al. U.S. Pat. No. 3,347,011, entitled "Packaging Machine and Method of Forming Packages," issued Oct. 17, 1967. The machine disclosed in this patent includes a plurality of pairs of chambers or dies into which is drawn portions of a heat sealable web to form pockets or packages which are subsequently filled and covered by applying a second heat sealable web over the filled packages. Thereafter the individual packages are severed from the webs and discharged to a take-away conveyor for subsequent processing, storage and/or shipment.

In accordance with the present invention, pluralities of pairs of packages are formed in a similar manner and each pair is subsequently severed from the webs. However, as opposed to being directly discharged from the machine, the pairs of packages are tipped or turned over and/or oriented prior to reaching the take-away conveyor. The purpose of turning over and/or orienting the packages is to present a particular portion of each package to subsequent processing equipment as, for example, printing, labeling, etc. machines.

Each chamber or die of the machine includes a pair of cavities which normally support the packages prior to being severed from the sealed webs. Openings are formed in a wall of the chamber through which project a pneumatically reciprocating platform which is normally positioned beneath each supported article. A guide chute having a medial slot is also carried by the chamber. During the operation of the machine, the chamber is raised at a discharge station at which time a suitable mechanism severs the pair of packages from the webs while the platform is beneath the packages. Each severed package drops under the influence of gravity or with additional assistance of air streams or pneumatically, hydraulically or mechanically operated punches; and contacts its associated platform while the latter is being retracted outwardly of the housing. As the platform is retracted gravity or additional assisting agents acting upon the package and the contents thereof causes each package to turn over and during this turnover operation the guide chute and supporting platform having an appropriate configuration corresponding to the weight, size and shape of the package assure accurate guidance of the severed and turning packages. Preferably this guidance is continued by a stationary guide chute at the discharge station which directs the packages toward the take-away conveyor.

The edges of the platform or platform portions are preferably disposed at an angle of approximately 0° to 60° relative to a plane normal to the direction of platform movement. This angulation of the platform edges serves to orient or rotate the packages as they are turned over. Depending upon the size, shape and weight of the particular packages, variations in the edge angulation achieve desired package rotation to assure that each package is subsequently presented to further processing machines (printers, labelers, etc.) at a desired orientation.

In further keeping with the present invention, each pair of packages is maintained in spaced relationship during and after discharge from their associated chambers by a vertical guide plate which is disposed generally in a plane between the die or chamber cavities. During the descent of the chamber at the discharge station, the medial slot of the movable discharge chute provides an access area into which projects the vertical guide plate, and by this construction each pair of packages is continuously maintained in spaced relationship during discharge from the chamber and subsequent transfer to the take-away conveyor.

With the above and other objects in view that will hereinafter appear, the nature of the invention will be more clearly understood by reference to the following detailed description, the appended claimed subject matter, and the several views illustrated in the accompanying drawings.

IN THE DRAWINGS:

FIG. 1 is a fragmentary side elevational view of a novel turnover and orienting machine of this invention, and illustrates a chamber housing a pair of packages and a retractable platform normally underlying each package whereby upon the severance of the packages from the sealed webs and the subsequent retraction of the platforms the packages are turned over in the manner progressively indicated in phantom outline.

Figure 2:
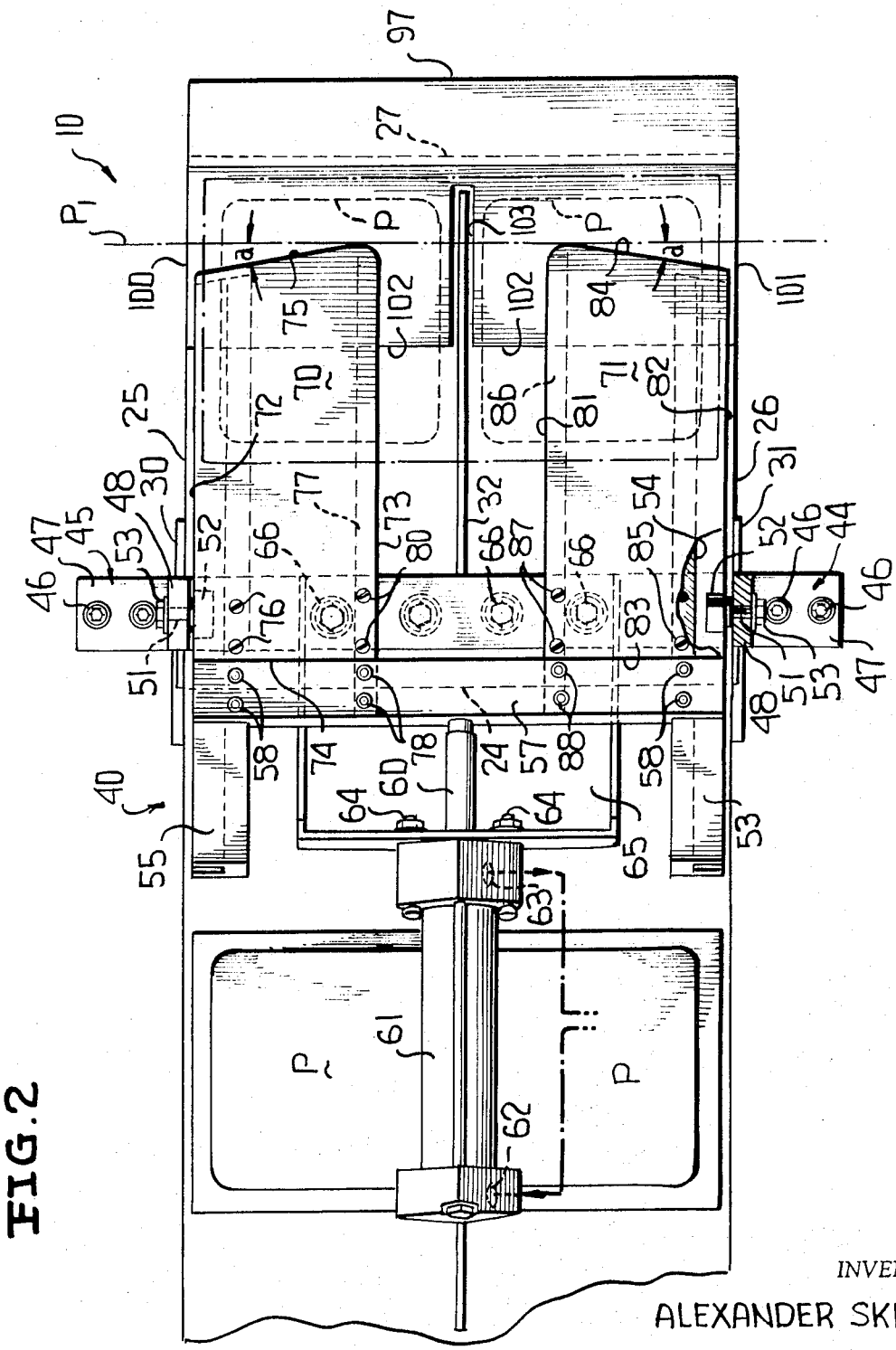

FIG. 2 is a fragmentary top perspective view of the machine of FIG. 1 with portions removed for clarity, and illustrates angular terminal edges of the platforms for orienting or rotating each package as it is turned over, and a vertical plate for maintaining each pair of packages spaced during subsequent discharge thereof to a take-away conveyor.

Referring particularly to the drawings, a novel package turnover and orienting machine is generally designated by the reference numeral 10, and includes a stationary support 11 and a movable conveyor 12, relative to the horizontal plane of motion. The conveyor 12 is of a conventional construction and the details thereof, as well as the mechanism for moving the same, is disclosed in the latter-noted patent. It is sufficient for a complete understanding of this invention to appreciate that the conveyor 12 moves in a horizontal plane from an entrance end (not shown) of the machine to a discharge station (FIGS. 1 and 2) and during various stages of the operation of the machine 10 vertical movement of the packaged product is effected, it being understood that this is possible because the packaged product is transferred onto the machine 10, which in turn is attached to vertically moving die housings, in a manner to be described more fully hereinafter.

The stationary support includes a base 13 and a pair of upright frame members 14, 15 (removed for clarity) of which the frame member 36 is provided with a generally rectangular upwardly opening slot 16 adjacent a take-away conveyor 17 having an upper run (unnumbered) adapted to move from right-to-left as viewed in FIG. 1 by suitable drive means (not shown). For this purpose, the conveyor 17 is entrained about a pulley 18 which is suitably journalled for rotation in a counterclockwise direction.

A bracket 20 has a leg 21 welded or otherwise conventionally secured to the frame member 14, and another leg 22 which is inclined upwardly and to the right as viewed in FIG. 1. The leg 22 of the bracket 20 is welded or otherwise conventionally secured to the under side of a generally rectangular fixed guide chute 23. As is best illustrated in FIG. 2, the fixed or stationary guide chute 23 includes a lower terminal edge 24 positioned slightly above the upper run of the conveyor belt 17 adjacent the pulley 18, a pair of side edges 25, 26 (FIG. 2), and an upper terminal edge 27 (FIG. 1) which is spaced slightly beneath a lower surface 28 of the die support plate. Adjacent the edge 24 of the stationary guide chute 23 and along the edges 25, 26 are a pair of generally triangular vertically disposed guide plates 30, 31. The guide plates 30, 31 are welded or otherwise conventionally secured to the respective edges 25, 26 (FIG. 2) of the stationary guide chute 23.

Positioned immediately between the guide plates 30, 31 is another generally triangular but larger vertically disposed guide plate 32 which is welded to the chute 23. The guide plate 32 is in alignment with another stationary guide plate 33 which is also disposed in a generally vertical plane and is suitably secured in slight spaced relationship above the upper run of the conveyor 17, as is best illustrated in FIG. 1.

The mechanism for turning each of the packages P over and orienting the same is generally designated by the reference numeral 40, which is secured to the die support plate 28 by an angle bar 41 having legs 42, 43 (FIG. 1). Bolts or similar fasteners (not shown) fasten to the leg 42 of the bracket 41 and are secured to the die support plate 28 in a conventional manner. A pair of angle brackets 44, 45 (FIG. 2) are secured to the leg 43 of the angle bar 41 by bolts 46 passing through legs 47 of each of the angle brackets 44, 45. Upstanding legs 48 of each of the angle brackets 44, 45 each include an elongated slot 50 through which passes a threaded bolt 51 carrying a cam 52 and secured in any desired position within the associated slot 50 by a nut 53. Each roller 52 is freely mounted for rotation upon the associated bolt 51 in a conventional manner, and is received in an associated channel 54 of a pair of channel bars 55, 56 As viewed in FIG. 2, the channel 54 of the channel bar 55 opens upwardly while the channel 54 of the channel bar 56 opens downwardly. The channel bars 55, 56 are secured to each other by transverse bar 57 by means of conventional fasteners 58. A piston rod 60 is threadably secured (not shown) in a threaded bore of the bar 57 and its piston (not shown) is reciprocally mounted in a hydraulically operated cylinder 61 having an inlet 62 and an outlet 63 connected by suitable valving to a source of air or fluid under pressure and/or vent. That is, if air or fluid pressure is introduced through the inlet 62 to move the piston rod 60 to the right, then the outlet 63 is vented and vice versa.

The cylinder 61 is connected by bolts and nuts, generally designated by the reference numeral 64 to a generally L-shaped plate 65 whose right-handmost end, as viewed in FIG. 2, is secured to the leg 43 of the angle bar 41 by a plurality of bolts or similar fasteners 66. The plate 65 therefore supports the cylinder 61 in a stationary position while the piston rod 60 may be reciprocated to move the channel bars 55, 56 in a manner and for a purpose to be described hereinafter.

Means in the form of a pair of platforms 70, 71 are supported upon and carried by the respective channel bars 55, 56. The platform 70 is of a generally rectangular configuration as viewed from above and includes a pair of longitudinal edges 72, 73 and a pair of transverse edges 74, 75, the latter of which is disposed at an angle ranging between 0 to 60 degrees relative to a plane normal to the direction of movement of the platform 70 which is left-to-right and right-to-left in FIG. 2. The platform 70 is secured to the channel bar 55 by fasteners 76. In addition, another bar 77 which is generally parallel to the channel bar 55 is secured to the bar 57 by fasteners 78 while fasteners 80 secure the platform 75 to the bar 77.

The platform 71 is likewise defined by a pair of longitudinal edges 81, 82 and a pair of transverse edges 83, 84, the latter of which is likewise disposed at an angle corresponding to that of the edge 75 of the platform 70. Likewise, fasteners 85 secure the platform 71 to the channel bar 56 while the opposite edge 81 is secured to a channel 86 by fasteners 87. The channel 86 is in turn connected to the bar 57 by fasteners 88.

Inasmuch as the platforms 70, 71 are each connected to the bar 57, the same are reciprocated simultaneously during reciprocal movement of the piston rod 60.

Referring particularly to FIG. 1 of the drawings, there is one turnover and orienting mechanism 40 associated with each of a pair of dies 90 carried by the conveyor 12. The dies 90 are of a generally conventional construction having two side walls 91, 92, a pair of end walls (not shown) and a transverse medial wall which when viewed in horizontal section imparts a generally block figure-eight construction to the die 90 and defines therein a pair of chambers or cavities which are contoured to the general configuration of the packages P, P illustrated in phantom outline in FIG. 2. The wall 91 has an opening 93 into each cavity or chamber 94. Thus, in the extended position of the platforms 70, 71, the platforms normally underlie each of the packages P in the manner clearly illustrated in FIGS. 1 and 2 such that as each pair of packages P is severed from the associated webs the same will drop downwardly under the influence of gravity (approximately one-eighth inch) upon the upper surfaces of the respective platforms 70, 71 for subsequent turnover and orientation, which will be described hereinafter. For positive package separation from the web additional package ejection device through the top of the die can be provided. This consists of either of the following:

1. Cam operated or otherwise electrically timed, symmetrically located two air jets in each die chamber. The pressure ratio between two air jets are adjustable to facilitate and to accelerate or decelerate the turning motion of the package.

2. A knockout punch located at the top of the die, cylinder operated by air or oil.

3. A knockout punch located at the top of the die, operated by mechanical linkages.

Associated with each of the dies 90 is a generally rectangular guide chute 95 which has a leg 96 secured in a conventional manner to the die support plate 28. The chute 95 is of a generally rectangular configuration and includes and edge 97 (FIG. 2), opposite edges 100, 101, and a leftmost and lowermost edge 102 which is interrupted by a slot 103 opening toward the left as viewed in FIG. 2. The slot 103 is in alignment with and receives a portion of the vertical plate 32.

OPERATION

During the operation of the machine 10, the packages P are formed from two webs in the manner described in the latter-noted patent during which time the packages, while still integral portions of the webs, are step-advanced to the discharge station (FIGS. 1 and 2). During this advancement the platforms 70, 71 are advanced to the right position to receive the packages after they are separated from the web by the upward motion of the die. As soon as the packages are separated from the web, the die 90 is descended by conventional means toward and to the position shown in FIG. 1. During the ascent of the die 90 the platforms 70, 71 are moved to the right to the position shown in FIG. 1 by introducing air or fluid under pressure into the cylinder 61 through the inlet 62 while the opposite side of the piston is vented through the outlet 63. The position of the machine 10 and the turnover mechanism 40 shown in FIG. 1 approximates that at the time that the packages P, P are severed by a conventional punch (not shown) from the web to form the two packages P, P at the right-hand side of FIG. 2 which are of a generally square configuration. Upon being severed from the webs the pair of packages P, P drop upon and temporarily rest upon the upper surfaces of the platforms 70, 71.

Simultaneously with or immediately after the severing of the packages P, P from the webs, air or hydraulic fluid is introduced into the cylinder 61 through the inlet 63 while the opposite side of the cylinder 61 is vented through the port 62 causing the retraction of the piston rod 60 into the cylinder 61. This movement is imparted to the platforms 70, 71 through the bar 57. The movement of the platforms 70, 71 to the left is, of course, guided by the co-action of the rollers 52 in the channels 54 of the channel bars 55, 56. Of course, the inclination of the platforms 70, 71 with respect to the horizontal can be adjusted as desired by loosening the nuts 53, tilting the platforms 70, 71 and the channel bars 55, 56, as desired, and retightening the nuts 53.

As the platforms 70, 71 move to the left, gravity or additional air or mechanical assistance acting upon the packages P causes the same to turn over in the manner illustrated in phantom outline in FIG. 1 until each package is turned through approximately 180°, as is illustrated by the left-handmost package of FIG. 1. During the turnover, the leading edge of each package P, which is the right-handmost edge in both FIGS. 1 and 2, is initially guided by the inner wall of the chambers 94 which is in general alignment with the inner surface of the chute 95, the chute 95 itself, and subsequently the stationary chute 23. Each pair of packages P is, of course, maintained in spaced relationship by the vertical plate 32 and the plate 33 which continually guide the packages P in conjunction with the terminal plates 30, 31.

Referring specifically to FIG. 2, it was heretofore noted that the edges 75, 84 of the platforms 70, 71, respectively, are disposed at an angle ranging between 0°–60° with respect to a plane normal to the direction of movement of the platforms 70, 71. The latter-noted plane is illustrated in FIG. 2 and is generally designated by the reference character P1. The angle of this plane with respect to the edges 75, 84 is indicated by the opposing unnumbered headed arrows designated by the reference numeral $a$. The angle $a$ is varied in the aforementioned manner to orient the packages P during the times the same are turned over. The term orient is intended to mean the rotation of the packages P about their vertical axes which in FIG. 2 achieves a counterclockwise rotation or orientation of the uppermost package P as the platform 70 is moved to the left and a clockwise rotation of the lowermost package P as the platform 71 is moved to the left. The degree of rotation is dependent on the size of the package, the configuration thereof, the weight thereof, and the angle a. By means of varying the angular relationship of platforms 70 and 71, a correction of package direction and orientation, which may be required due to any disequilibrating forces, acting on the package during the turnover cycle, be it due to gravity, vibration or contact with other objects, can be accomplished in addition to the regular orientation described above. As an example, accurate and repetitive turnover and orientation has been achieved in a commercial embodiment of the machine 10 by the use of an angle between 7°–7½° for 4 to 6 ounce packages while up to 13° has been found successful for packages ranging in size between 8 ounces and 12 pounds.

It is to be understood that the machine 10 may be operated with the edges 75, 84 parallel to the plane P1 to achieve "pure" turnover or the angle a may be varied to complement the turnover procedure by affecting orientation. In the latter case the walls of the chamber 94, the chutes 95, 23 and the plates 30–32 guide and maintain the orientation of the packages toward and upon the upper run of the take-away conveyor 17 for subsequent processing.

While preferred forms and arrangements of parts have been shown in illustrating the invention, it is to be clearly understood that various changes in details and arrangement of parts may be made without departing from the spirit and scope of this disclosure.

What is claimed is:

1. A machine for orienting articles comprising means defining a chamber through which articles are adapted to pass in a generally downward direction under the influence of gravity, platform means within said chamber for contacting an article incident to the passage thereof through said chamber, means for moving said chamber and platform to a discharge station, and means for retracting said platform means outwardly of said chamber whereby gravity imparts a tipping movement to each article as it is discharged outwardly of said chamber.

2. The article orienting machine as defined in claim 1 including guide means beneath said platform means for guiding each article as the same is discharged from said chamber.

3. The article orienting machine as defined in claim 1 including guide means beneath said chamber and movable therewith for guiding each article as the same is discharged from said chamber at said discharge station.

4. The article orienting machine as defined in claim 3 wherein said articles are packages formed from web material, and means for severing each article from the web material to initiate the downward gravity influenced movement thereof.

5. The article orienting machine as defined in claim 3 wherein said platform means includes means for additionally causing the rotation of each article about an upright axis thereof upon the outward retraction of said platform means.

6. The article orienting machine as defined in claim 3 wherein said articles are packages formed from web material, means for severing each article from the web material to initiate the downward gravity influenced movement thereof, and said platform means includes means for additionally causing the rotation of each article about an upright axis thereof upon the outward retraction of said platform means.

7. The article orienting machine as defined in claim 3 wherein said platform means is disposed in a generally horizontal plane, and means for selectively adjusting the inclination of said platform means relative to the horizontal.

8. The article orienting machine as defined in claim 1 including guide means beneath said chamber and movable therewith for guiding each article as the same is discharged from said chamber at said discharge station, and stationary guide means at said discharge station for receiving each article from said movable guide means for continuing the guidance of each article as the same leaves the movable guide means.

9. The article orienting machine as defined in claim 1 wherein said platform means is disposed in a generally horizontal plane, and means for selectively adjusting the inclination of said platform means relative to the horizontal.

10. The article orienting machine as defined in claim 9 wherein said articles are packages formed from web material, and means for severing each article from the web material to initiate the downward gravity influenced movement thereof.

11. The article orienting machine as defined in claim 9 wherein said platform means includes means for additionally causing the rotation of each article about an upright axis thereof upon the outward retraction of said platform means.

12. The article orienting machine as defined in claim 9 wherein said articles are packages formed from web material, means for severing each article from the web material to initiate the downward gravity influenced movement thereof, and said platform means includes means for additionally causing the rotation of each article about an upright axis thereof upon the outward retraction of said platform means.

13. The article orienting machine as defined in claim 1 wherein said articles are packages formed from web material, and means for severing each article from the web material to initiate the downward gravity influenced movement thereof.

14. The article orienting machine as defined in claim 1 wherein said platform means includes means for additionally causing the rotation of each article about an upright axis thereof upon the outward retraction of said platform means.

15. The article orienting machine as defined in claim 1 wherein said articles are packages formed from web material, means for severing each article from the web material to initiate the downward gravity influenced movement thereof, and said platform means includes means for additionally causing the rotation of each article about an upright axis thereof upon the outward retraction of said platform means.

16. The article orienting machine as defined in claim 1 wherein said platform means includes means for additionally causing the rotation of each article about an upright axis thereof upon the outward retraction of said platform means.

17. A machine for orienting articles comprising means defining a chamber through which articles are adapted to pass in a generally downward direction under the influence of gravity, platform means within said chamber for contacting an article incident to the passage thereof through said chamber, means for retracting said platform means outwardly of said chamber whereby gravity imparts a tipping movement to each article as it is discharged outwardly of said chamber, said articles are packages formed from web material, and means for severing each article from the web material to initiate the downward gravity influenced movement thereof.

18. The article orienting machine as defined in claim 17 including means for advancing said package of web material to said severing means.

19. The article orienting machine as defined in claim 18 wherein said platform means includes means for additionally causing the rotation of each article about an upright axis thereof upon the outward retraction of said platform means.

20. The article orienting machine as defined in claim 18 including means for moving said chamber and platform to a discharge station.

21. The article orienting machine as defined in claim 17 including means for augmenting the gravity discharge of said articles during discharge thereof outwardly of said chamber.

22. The article orienting machine as defined in claim 17 including guide means beneath said chamber and movable therewith for guiding each article as the same is discharged from said chamber at said discharge station.

23. The article orienting machine as defined in claim 17 wherein said platform means is disposed in a generally horizontal plane, and means for selectively adjusting the inclination of said platform means relative to the horizontal.

24. The article orienting machine as defined in claim 17 wherein said platform means includes means for additionally causing the rotation of each article about an upright axis thereof upon the outward retraction of said platform means.

25. A machine for orienting articles comprising means defining a chamber through which articles are adapted to pass in a generally downward direction under the influence of gravity, platform means within said chamber for contacting an article incident to the passage thereof through said chamber, means for retracting said platform means outwardly of said chamber whereby gravity imparts a tipping movement to each article as it is discharged outwardly of said chamber, and said platform means include means for additionally causing the rotation of each article about an upright axis thereof upon the outward retraction of said platform means.

26. The article orienting machine as defined in claim 25 wherein said rotation causing means is a terminal edge of said platform means disposed at an angle ranging up to 60° relative to a plane normal to the direction of movement of said platform means.

27. The article orienting machine as defined in claim 25 wherein said platform means is a pair of platforms each having a terminal edge, and said rotation causing means is a terminal edge of each platform disposed at an angle ranging up to 60° relative to a plane normal to the direction of movement of said platforms.

28. The article orienting machine as defined in claim 27 wherein said terminal edges are mirror images of each other.

29. The article orienting machine as defined in claim 25 wherein said articles are packages formed from web material, and means for severing each article from the web material to initiate the downward gravity influenced movement thereof.

30. The article orienting machine as defined in claim 25 wherein said articles are packages formed from web material, means for severing each article from the web material to initiate the downward gravity influenced movement thereof, and said platform means includes means for additionally causing the rotation of each article about an upright axis thereof upon the outward retraction of said platform means.

* * * * *